United States Patent
Kumar et al.

(10) Patent No.: US 11,151,609 B2
(45) Date of Patent: Oct. 19, 2021

(54) CLOSED LOOP ATTRIBUTION

(71) Applicant: Alphonso Inc., Mountain View, CA (US)

(72) Inventors: Amit Kumar, Mountain View, CA (US); Nikhil Sahasrabudhe, Pune (IN)

(73) Assignee: Alphonso Inc., Mountain View, CA (US)

( * ) Notice: Subject to any disclaimer, the term of this patent is extended or adjusted under 35 U.S.C. 154(b) by 21 days.

(21) Appl. No.: 16/241,975

(22) Filed: Jan. 7, 2019

(65) Prior Publication Data

US 2020/0219130 A1 Jul. 9, 2020

(51) Int. Cl.
*G06Q 30/02* (2012.01)

(52) U.S. Cl.
CPC ..... *G06Q 30/0261* (2013.01); *G06Q 30/0201* (2013.01); *G06Q 30/0205* (2013.01); *G06Q 30/0246* (2013.01); *G06Q 30/0275* (2013.01); *G06Q 30/0276* (2013.01)

(58) Field of Classification Search
USPC .......................................... 705/14.64, 14.63
See application file for complete search history.

(56) References Cited

U.S. PATENT DOCUMENTS

| | | | |
|---|---|---|---|
| 8,316,411 B2 | 11/2012 | Weintraub et al. | |
| 9,055,333 B2 | 6/2015 | Whitten | |
| 9,094,720 B2 | 7/2015 | Malik | |
| 9,736,503 B1 | 8/2017 | Bakshi et al. | |
| 9,838,755 B1 | 12/2017 | Kodige et al. | |
| 9,967,625 B2 | 5/2018 | Korst et al. | |
| 9,980,011 B2 | 5/2018 | Ray et al. | |
| 2002/0046084 A1* | 4/2002 | Steele | H04L 65/4076 705/14.64 |
| 2002/0059313 A1 | 5/2002 | Yoon et al. | |
| 2002/0059584 A1 | 5/2002 | Ferman et al. | |
| 2002/0174430 A1 | 11/2002 | Ellis et al. | |

(Continued)

OTHER PUBLICATIONS

Recommender system. Retrieved Feb. 27, 2018, from https://en.wikipedia.org/wiki/Recommender_system.

(Continued)

*Primary Examiner* — Afaf Osman Bilal Ahmed
(74) *Attorney, Agent, or Firm* — Ungerman IP PLLC; Mark E Ungerman

(57) ABSTRACT

A closed loop attribution system may include a user location history storage system containing information indicative of user location history for a plurality of users based on location of a mobile device associated with a user; a user database storage system containing placement tracking information indicative of advertising content presented to the user; and a closed loop attribution processor responsive to said user location history storage system and said user database storage assessing correlations between a user's exposure and a user's location. The user database may include records indicative of user behavior and characteristics. The closed loop attribution processor may be connected to the campaign database and the campaign database may contain an indication of one or more locations of interest to an advertiser. The correlation between user exposure and a user's location may be a correlation between user exposure and the location or locations of interest.

6 Claims, 7 Drawing Sheets

(56) References Cited

U.S. PATENT DOCUMENTS

| | | |
|---|---|---|
| 2004/0117829 A1 | 6/2004 | Karaoguz et al. |
| 2006/0031889 A1 | 2/2006 | Bennett et al. |
| 2006/0083434 A1 | 4/2006 | Inata et al. |
| 2007/0124756 A1 | 5/2007 | Covell et al. |
| 2007/0157247 A1 | 7/2007 | Cordray et al. |
| 2007/0157260 A1 | 7/2007 | Walker |
| 2007/0157281 A1 | 7/2007 | Ellis et al. |
| 2008/0155059 A1 | 6/2008 | Hardin et al. |
| 2008/0235733 A1 | 9/2008 | Heie et al. |
| 2009/0030780 A1 | 1/2009 | York et al. |
| 2009/0201988 A1 | 8/2009 | Gazier et al. |
| 2010/0086277 A1 | 4/2010 | Craner |
| 2010/0231754 A1 | 9/2010 | Wang et al. |
| 2011/0078717 A1 | 3/2011 | Drummond et al. |
| 2011/0246267 A1 | 10/2011 | Williams et al. |
| 2011/0246310 A1 | 10/2011 | Buchalter et al. |
| 2011/0289114 A1 | 11/2011 | Yu et al. |
| 2011/0307929 A1 | 12/2011 | Youssefmir et al. |
| 2012/0041816 A1 | 2/2012 | Buchalter |
| 2012/0117339 A1 | 5/2012 | Kandekar et al. |
| 2012/0210382 A1 | 8/2012 | Walker et al. |
| 2013/0014187 A1 | 1/2013 | Huang et al. |
| 2013/0066725 A1 | 3/2013 | Umeda |
| 2013/0071090 A1 | 3/2013 | Berkowitz et al. |
| 2013/0142499 A1 | 6/2013 | Major et al. |
| 2013/0174202 A1 | 7/2013 | Kim et al. |
| 2013/0205318 A1 | 8/2013 | Sinha et al. |
| 2013/0275205 A1 | 10/2013 | Vinson et al. |
| 2014/0013342 A1 | 1/2014 | Swan et al. |
| 2014/0025837 A1 | 1/2014 | Swenson et al. |
| 2014/0067898 A1 | 3/2014 | Steiner et al. |
| 2014/0109124 A1 | 4/2014 | Morales et al. |
| 2014/0136342 A1 | 5/2014 | Ringdahl |
| 2014/0165116 A1 | 6/2014 | Major et al. |
| 2014/0237525 A1 | 8/2014 | Rothschild et al. |
| 2014/0282761 A1 | 9/2014 | Bjordammen et al. |
| 2014/0316900 A1* | 10/2014 | Amla ................ G06Q 30/0266 705/14.63 |
| 2014/0324603 A1 | 10/2014 | Savkar et al. |
| 2015/0120468 A1 | 4/2015 | Knapp et al. |
| 2015/0235259 A1 | 8/2015 | Maycotte et al. |
| 2015/0334430 A1 | 11/2015 | Clapp |
| 2015/0350701 A1 | 12/2015 | Lemus et al. |
| 2015/0370814 A1 | 12/2015 | Liodden et al. |
| 2016/0125452 A1 | 5/2016 | Kemp et al. |
| 2016/0210660 A1 | 7/2016 | Flynn |
| 2016/0314493 A1 | 10/2016 | Udassin |
| 2016/0364767 A1 | 12/2016 | Maugans, III |
| 2017/0034593 A1 | 2/2017 | Ray et al. |
| 2017/0068987 A1 | 3/2017 | Levinson et al. |
| 2017/0357998 A1 | 12/2017 | Scharf |
| 2017/0364964 A1 | 12/2017 | Wang |
| 2018/0225709 A1 | 8/2018 | Ferber et al. |
| 2018/0246619 A1 | 8/2018 | Galarneau et al. |
| 2019/0122251 A1 | 4/2019 | Hoffman et al. |

OTHER PUBLICATIONS

Alphonso Inc, Ex. 2003. Lee, Edmund, New York Times Article, "As TV Industry's $20 Billion Week Starts, Signs That Streaming Isn't King Yet," published May 19, 2019, *Free Stream Media Corp. d/b/a Samba TV*, Petitioner v. *Alphonso Inc.*, Patent Owner, Case: IPR2019-00790, filed Jun. 21, 2019 in the USPTO Patent Trial and Appeal Board, 5 pages.

Alphonso Inc, Ex. 2004. Long, Lucas, Article: "Marketing Tags and Pixels—What They Are and How They Work", *Free Stream Media Corp. d/b/a Samba TV*, Petitioner v. *Alphonso Inc.*, Patent Owner, Case: IPR2019-00790, filed Jun. 21, 2019 in the USPTO Patent Trial and Appeal Board, 3 pages.

Alphonso Inc, Ex. 2005. TAPAD, "Device Graph Access (DGA) At a Glance" *WHITEPAPER, Free Stream Media Corp. d/b/a Samba TV*, Petitioner v. *Alphonso Inc.*, Patent Owner, Case: IPR2019-00790, filed Jun. 21, 2019 in the USPTO Patent Trial and Appeal Board, 6 pages.

Alphonso Inc., Ex. 2001, Declaration of W. Leo Hoarty in Support of Patent Owner's Preliminary Response, *Free Stream Media Corp. d/b/a Samba TV*, Petitioner v. *Alphonso Inc.*, Patent Owner, Case: IPR2019-00790, filed Jun. 21, 2019 in the USPTO Patent Trial and Appeal Board, 98 pages.

Alphonso Inc., Ex. 2002, CV of W. Leo Hoarty, *Free Stream Media Corp. d/b/a Samba TV*, Petitioner v. *Alphonso Inc.*, Patent Owner, Case: IPR2019-00790, filed Jun. 21, 2019 in the USPTO Patent Trial and Appeal Board, 10 pages.

Audible Magic.RTM. product brochures: Core Technology & Services Overview, Broadcast Monitoring, and Media Identification. Audible Magic Corporation, Los Gatos, California, downloaded from web pages at http://www.audiblemagic.com, download date: Aug. 11, 2016, 11 pages.

Gracenote Entourage.TM., Gracenote, Inc., Emeryville, California, downloaded from webpage: http://www.gracenote.com/video/media-recognition-and-insights/, download date: Aug. 24, 2016, 5 pages.

Notice of Filing Date Accorded to Petition and Time for Filing Patent Owner Preliminary Response, *Free Stream Media Corp. d/b/a Samba TV*, Petitioner v. *Alphonso Inc.*, Patent Owner, Case: IPR2019-00790, dated Mar. 21, 2019 by the USPTO Patent Trial and Appeal Board, 5 pages.

Patent Owner's Mandatory Notices Pursuant to 37 C.F.R. Section 42.8, *Free Stream Media Corp. d/b/a Samba TV*, Petitioner v. *Alphonso Inc.*, Patent Owner, Case: IPR2019-00790, filed Mar. 26, 2019 in the USPTO Patent Trial and Appeal Board, 4 pages.

Petition for Inter Partes Review of U.S. Pat. No. 9,838,755 Challenging Claims 1-6,10-18, 22-29 Under 35 U.S.C. Section 312 and 37 C.F.R. Section 42.104, *Free Stream Media Corp. d/b/a Samba TV*, Petitioner v. *Alphonso Inc.*, Patent Owner, Case: IPR2019-00790, filed Mar. 5, 2019 in the USPTO Patent Trial and Appeal Board, 79 pages.

Preliminary Response of Patent Owner Alphonso Inc. to Petition for Inter Partes Review, *Free Stream Media Corp. d/b/a Samba TV*, Petitioner v. *Alphonso Inc.*, Patent Owner, Case: IPR2019-00790, filed Jun. 21, 2019 in the USPTO Patent Trial and Appeal Board, 69 pages.

Samba Exhibit-1002, USPTO Report on the Filing or Determination of an Action Regarding a Patent or Trademark, *Free Stream Media Corp. d/b/a Samba TV*, Petitioner v. *Alphonso Inc.*, Patent Owner, Case: IPR2019-00790, filed Mar. 5, 2019 in the USPTO Patent Trial and Appeal Board, 139 pages.

Samba Exhibit-1003, Declaration of Charles Thomas in Support of Petition for Inter Partes Review of U.S. Pat. No. 9,838,755, *Free Stream Media Corp. d/b/a Samba TV*, Petitioner v. *Alphonso Inc.*, Patent Owner, Case IPR2019-00790, filed Mar. 5, 2019 in the USPTO Patent Trial and Appeal Board, 109 pages.

Samba Exhibit-1008. Banasiewicz, Andrew D, Marketing Database Analytics—Transforming Data for Competitive Advantage, published 2013, Published in the UK, *Free Stream Media Corp. d/b/a Samba TV*, Petitioner v. *Alphonso Inc.*, Patent Owner, Case: IPR2019-00790, filed Mar. 5, 2019 in the USPTO Patent Trial and Appeal Board, 32 pages.

Samba Exhibit-1009. Smith, Aaron, "Smartphone Ownership—2013 Update", published Jun. 5, 2013 by Pew Research Center's Internet & American Life Project, Washington, DC, *Free Stream Media Corp. d/b/a Samba TV*, Petitioner v. *Alphonso Inc.*, Patent Owner, Case: IPR2019-00790, filed Mar. 5, 2019 in the USPTO Patent Trial and Appeal Board, 12 pages.

Samba Exhibit-1010. Leichtman Research Group (LRG) Press Release, "65% of U.S. TV Households Have a Connected TV," Apr. 22, 2016, Durham, NH, *Free Stream Media Corp. d/b/a Samba TV*, Petitioner v. *Alphonso Inc.*, Patent Owner, Case: IPR2019-00790, filed Mar. 5, 2019 in the USPTO Patent Trial and Appeal Board, 2 pages.

Samba Exhibit-1011, iab. Cross-Media Ad Effectiveness Study dated Jan. 2017, *Free Stream Media Corp. d/b/a Samba TV*, Petitioner v. *Alphonso Inc.*, Patent Owner, Case: IPR2019-00790, filed in the USPTO Patent Trial and Appeal Board, 37 pages.

Samba Exhibit-1012. Weitz, Jonathan, IBB Consulting, Article "Guest Blog: Driving Live Tune-In in an On-Demand, Digital Age",

(56) References Cited

OTHER PUBLICATIONS published Jan. 22, 2016, *Free Stream Media Corp. d/b/a Samba TV*, Petitioner v. *Alphonso Inc.*, Patent Owner, Case: IPR2019-00790, filed Mar. 5, 2019 in the USPTO Patent Trial and Appeal Board, 6 pages.

Samba Exhibit-1013. Prakash, Amit, "Measuring Marketing: How to measure lift from any marketing effort?" Published Jun. 12, 2008, http://measuringemarketing.blogspot.com/2008/06/how-to-measure-lift-from-any-marketing.html, *Free Stream Media Corp. d/b/a Samba TV*, Petitioner v. *Alphonso Inc.*, Patent Owner, Case: IPR2019-00790, filed Mar. 5, 2019 in the USPTO Patent Trial and Appeal Board, 8 pages.

Wikipedia entry for "Automatic Content Recognition." downloaded from web page: https://en.wikipedia.org/w/index.php?title=Automatic.sub.-content-sub-recognition&printable=yes, download date: Aug. 11, 2016, 4 pages.

\* cited by examiner

FIG. 5

| 440 | | BID ID #1,345,937,948 | BID ID #5,738,447,981 |
|---|---|---|---|
| 503 | IP Address | 338.956.020 | 212.975.783 |
| 504 | Device ID | 55-593-558 | 93-220-493 |
| 505 | Operating System | Windows | Windows |
| 506 | Browser | Chrome | Firefox |
| 507 | Domain | espn.com | youtube.com |
| 508 | URL | www.espn.com | https://www.youtube.com/music |
| 509 | Timestamp | 294833920 | 940300941 |
| 510 | Country | 2 | 2 |
| 511 | Region | 55 | 12 |
| 512 | City | 185 | 843 |
| 513 | Ad Slot Size | 500*345 | 500*345 |
| 514 | Ad Exchange | Google | Google |
| 515 | Content Category | Sports | Music |
| 516 | Campaign ID | 23 | 43 |
| 517 | Creative ID | 499 | 275 |

CLOSED LOOP ATTRIBUTION

BACKGROUND OF THE INVENTION

1. Field of the Invention

The invention relates to evaluating effectiveness of marketing, and particularly to use of user location data to assess advertising effectiveness.

2. Description of the Related Technology

A publisher may generate revenue by including advertising space in its content and work with an ad network to monetize that space. A publisher may include code in its HTML content that refers a browser to the ad network.

Real-time bidding (RTB) is a procedure to buy/sell advertising inventory on a per-impression basis, via programmatic instantaneous auction, like financial markets. With real-time bidding, advertising buyers bid on an impression and, if the bid is won, the buyer's ad is instantly displayed on the publisher's site. Real-time bidding lets advertisers manage and optimize ads from multiple ad networks by granting the advertiser/bidding agency access to a multitude of different networks, allowing them to create and launch advertising campaigns, prioritize networks and allocate percentages of unsold inventory.

Real-time bidding is distinguishable from static auctions by how it is a per-impression way of bidding whereas static auctions are groups of up to several thousand impressions. RTB is promoted as more effective than static auctions for both advertisers and publishers in terms of advertising inventory sold, though the results vary by execution and local conditions.

A typical transaction begins with a user visiting a website. This triggers a bid request that can include various pieces of data such as the user's demographic information, browsing history, location, and the page being loaded. The request goes from the publisher to an ad exchange, which submits it and the accompanying data to multiple advertisers who automatically submit bids in real time to place their ads. Advertisers bid on each ad impression as it is served. The impression goes to the highest bidder and their ad is served on the page. This process is repeated for every ad slot on the page. RTB transactions typically happen within 100 milliseconds (including receiving the bid request and serving the ad) from the moment the ad exchange received the request.

The bidding happens autonomously, and advertisers set maximum bids and budgets for an advertising campaign. The criteria for bidding on types of consumers can be very complex, considering everything from very detailed behavioral profiles to conversion data. Probabilistic models can be used to determine the probability for a click or a conversion given the user history data. This probability can be used to determine the size of the bid for the respective advertising slot.

A Real-time bidding system is shown in U.S. Pat. No. 6,324,519 B1 entitled, "Advertisement Auction System," and is expressly incorporated by reference herein and discloses an advertisement auction system in which content/opportunity providers announce to advertisers that they have an opportunity to present an advertisement to a consumer, and the advertiser transmits ad characterization information which is correlated with the consumer profile.

Data augmentation may be applied to many problems which involve the use of data to make decisions based on a set of criteria. Data augmentation adds value to data by adding information derived from internal and external sources. Data augmentation may be a way to reduce overfitting of models. Overfitting may arise when a model relies on a small or incomplete data set. Data augmentation systems may improve decision-making by either increasing the amount of data, or by improving methods that make use of the data.

A data augmentation system is shown in U.S. Pat. No. 8,332,334 B2 entitled, "System and Method for Cross Domain Learning for Data Augmentation," and is expressly incorporated by reference herein and discloses, in part, a system for generating a new target function using a labeled target domain data, a labeled source domain data, and a weighting factors for a labeled source domain data, for evaluating the performance of the new target function to determine if there is a convergence.

Tracking pixels are used on web pages or email, to unobtrusively (usually invisibly) allow confirmation that a user has accessed some content.

Tracking pixels may be used to track information such as who is reading a web page or email, when, and from which computer. They can also be used to see if an email was read or forwarded to someone else, or if a web page was copied to another website.

Often, emails and web pages may refer to content on another server, rather than including the content directly. When an email client or web browser prepares such an email or web page for display, it ordinarily sends a request to the server that is referred to in the content to send additional content.

These requests may include information such as the IP address of the requesting computer, the time the content was requested, the type of web browser that made the request, and the existence of cookies previously set by that server. The additional content may include a unique tracking pixel.

A tracking pixel may be a small (usually transparent) GIF or PNG image (or an image of the same color as the background) that is embedded in an HTML page, usually a page on the web or the content of an email. Tracking pixels may also use HTML IFRAME, style, script, input link, embed, object, and other tags to track usage. Whenever a user opens a webpage or email, such image and other information is downloaded. This download requires the browser to send a request to the server storing that image or information, allowing the organization running that server to keep track of the HTML page.

The use of a tracking agent for use in the online advertisement space is shown in U.S. Pat. No. 9,105,028 B2 entitled, "Monitoring Clickstream Behavior of Viewers of Online Advertisements and Search Results," and is expressly incorporated by reference herein and discloses tracking and analyzing a computer user's behavior after viewing a search result or an advertisement to assess the impact of having viewed the search result or advertisement.

The additional content may be an ad for insertion in the display of a web page. The ad may be fetched from a third-party ad server, not from the server the main webpage was fetched from. This configuration separates the advertiser from the ad delivery process. Advertisers may include a tracking pixel/web beacon to gather information relating to the ad placement from the consuming device. This allows the potential for the advertisers and/or ad agencies to confirm consumption of ads placed in content delivered by a publisher.

While tracking pixels are used in the same way in web pages or emails, they may have different purposes. If the tracking pixel is embedded in an email such as an HTML message, the tracking pixel may trigger interaction with an additional server when a user reads the email for the first time and/or each time that the user subsequently loads the email. Whenever a web page (with or without tracking pixel) is downloaded, the server holding the page knows and can store the IP address of the computer requesting the page; this information can therefore be retrieved from the server log files without the need of using tracking pixel. Tracking pixels may be advantageous when the monitoring party does not have access to or trust the server logs. This may happen when a web site owner does not control its web servers (such as in web hotels), because monitoring is done by a third party, or a greater level of detail needs to be recorded than is possible from web log analysis alone.

As with any files transferred using the Hypertext Transfer Protocol, a tracking pixel identifies the location of a resource that is being requested.

The URL referred to by the tracking pixel can be appended with a data string in various ways while still identifying the same object. The appended data string can be used to better identify the conditions under which the tracking pixel has been loaded. The appended data string may be included in the tracking pixel being sent to a user or may be formed at a user's browser, for example, by a JavaScript included in the tracking pixel or delivered in response to a resource request of the tracking pixel.

For example, an email sent to the address smith@example.org can contain the embedded "image" of with a URL http://smith.com/bug.gif?somebody@example.org. Whenever the user reads the email, the image at this URL is requested. The part of the URL after the question mark is ignored by the server for determining which file to send, but the complete URL is stored in the server's log file. As a result, the file bug.gif is sent and shown in the email reader; at the same time, the server stores the fact that the email sent to smith@example.org has been read.

Tracking pixels may also be used in combination with HTTP cookies like any other object transferred using the HTTP protocol. Tracking pixels have several advantages over other tracking devices. For example, many modern browsers are configured to not allow cookies. In addition, cookies are not compatible with many mobile computing platforms.

U.S. Pat. No. 8,831,987 B2 entitled, "Managing Bids in a Real-time Auction for Advertisements," and is expressly incorporated by reference herein and shows a system for conducting an auction for advertising across multiple markets.

U.S. Pat. No. 6,324,519 B1 entitled, "Advertisement Auction System," and is expressly incorporated by reference herein, discloses an advertisement auction system in which content/opportunity providers announce to advertisers that they have an opportunity to present an advertisement to a consumer, and the advertiser transmits ad characterization information which is correlated with the consumer profile.

U.S. Pat. No. 7,856,378 B2 entitled, "Method and System for Facilitating Trading of Media Space" is expressly incorporated herein by reference, discloses a system for trading media space includes a server node which receives requests for media space from buyers and offers of media space from sellers. The server node includes a set of rules for matching one of the requests and one of the offers to form a matched request and offer pair. A delivery system is connected to said server node for facilitating delivery of media content between the buyer and seller of the matched pair.

U.S. Pat. No. 9,129,313 B1 entitled, "System and method for optimizing real-time bidding on online advertisement placements utilizing mixed probability methods" is expressly incorporated herein by reference, discloses a system and method for optimizing real-time bidding on advertisements by utilizing mixed probability methods. The system assigns several probability scores based on various criterion, and then calculates a combined probability score and threshold based on these scores when a real-time bid request is received.

U.S. Pat. No. 9,105,028 B2 entitled, "Monitoring Clickstream Behavior of Viewers of Online Advertisements and Search Results," and is expressly incorporated by reference herein, discloses tracking and analyzing a computer user's behavior after viewing a search result or a particular advertisement to assess the impact of having viewed the search result or advertisement.

U.S. Pat. No. 8,332,334 B2 entitled, "System and Method for Cross Domain Learning for Data Augmentation," and is expressly incorporated by reference herein, discloses in part generating a new target function using a labeled target domain data, a labeled source domain data, and a weighting factors for a labeled source domain data, an evaluating a performance of the new target function to determine if there is a convergence.

U.S. Patent Publication No. 2015/0331660 A1 entitled, "Efficient Apparatus and Method for Audio Signature Generation Using Audio Threshold," is expressly incorporated by reference herein and shows an automatic content recognition system that includes a user device for capturing audio and generating an audio signature.

An advertising attribution system determines an attribution value for a set of advertising modalities associated with a conversion event. U.S. Pat. No. 8,775,248 B1 entitled "Advertising Conversion Attribution" is expressly incorporated by reference herein, and shows an attribution system where the advertising modalities, each provided with an advertisement to a user, and performed a conversion event. The conversion value associated with each of a plurality of modality subsets is determined representing the value to the advertiser of providing advertisements by the modality in each modality subset. Based on the conversion value of each modality subset, a marginal value for each modality is determined for the set of modalities associated with the conversion event.

Advertisers may place advertisements to be viewed by a potential customer through a variety of advertising modalities. Advertising modalities are the mechanisms and methods by which an advertisement is delivered to a customer and may be characterized by a variety of attributes. For example, an attribute may include a particular channel of advertising distribution, such as a weekly flyer, an e-mail service, text messages, or internet advertisements. Other attributes can include the time of day the message was posted or delivered, the size and shape of the advertisement, the type of advertising such as text, pictorial, or video advertising. The same potential customer (or "user") may be provided multiple advertisements by various modalities for the same advertiser. For example, a user may receive various advertisements such as by a television advertisement, a website advertisement, etc.

When the user views an advertisement, or at a later time, the user may visit the advertiser and perform a desired activity. According to U.S. Pat. No. 8,775,248, the desired activity is termed a conversion. For many advertisers, a conversion is product purchase, though the conversion may also be completing a survey, electing to receive additional information, or otherwise positively interacting with the advertiser. Conversion events are defined by the advertiser and broadly can be any event where a monetary value can be associated with the user activity.

Once a given user converts following exposure to an advertisement, it can be difficult for the advertiser to determine the contribution of the user's conversion of each different advertising modality that provided an advertisement to the user prior to the conversion. Since many conversions are the result of a user viewing several advertisements for the advertiser from various content providers, standard conversion attribution techniques, such as "last viewed", undervalue the contribution of earlier advertisements in convincing the user to convert to the advertiser. These techniques may also fail to account for multiple conversion events for the same user.

U.S. Pat. No. 9,838,755, the disclosure of which is expressly incorporated herein by reference, shows a system and method for determining TV Tune-In Attribution.

SUMMARY OF THE INVENTION

Several enhancements to real-time bidding systems are disclosed herein which include: a system for cross-platform data augmentation to facilitate coordination across advertising bidding platforms.

The attribution system may be utilized in connection with a real-time bidding system. The attribution system may be associated with an augmented data set collected in connection with content exposure monitoring such as disclosed in U.S. patent application Ser. Nos. 16/241,966, 16/241,969, 16/241,971, 16/241,973, 16/241,974, which describe enhancements to real-time bidding systems including: a system for cross-platform data augmentation to facilitate coordination across advertising bidding platforms.

Another enhancement is a system for bidding optimization reach limitations, which limits the number of eligible users for any ad or brand with the goal of maximizing the number of users that receive at least the minimum impression level and minimizes the number of users which receive more than the maximum impression level. Another enhancement may be a bid management system based on the source of the advertising opportunity. Tracking the source of a bid request allows an advertiser to limit the number of impressions which are correlated by limiting the same to an opportunity source. This allows an advertiser to distribute ads over a greater number of ad opportunity sources. For example, bids may be restricted based on the number of successful placements to users of specified apps according to the specified threshold or to visitors of specified websites according to specified thresholds. Another enhanced bid management tool is to infer viewership activity by correlating television viewership information with bid request source, which allows an advertiser to place bids based on a bid request source having an inferred viewership or demographic information without full access to such information. Another enhanced bid management tool is to limit bids based on a subclass of viewership information. This tool allows identification of ad opportunity targets who have been exposed to a designated type of media, for example, sports programming, but to limit placements to users based on a threshold level for users who have viewed a subclass of the programming type. For example, a limited number of ad placements may be allocated to tennis, even if all the sports programming allocation is not filled.

The effectiveness of ad placement through bidding platforms, particularly in real-time bidding systems, can be enhanced through management of the bid forming logic and evaluation of available data. It is important to provide enhanced capabilities for an advertiser or agency to manage ad placements according to protocols designed in accordance with placement strategies.

A variety of bidding management enhancements are described herein. The bidding management enhancements may be used independently or combined with some or all the enhancements described herein and with other bidding management tools.

Demand-side platforms generally have certain campaign management tools which include: budget pacing, which allows a marketer to set a daily or weekly campaign budget that the ad server uses to make appropriate bids; cross-device capabilities, which are able to use functions such as targeting, frequency, campaign, budget pacing, creative optimization, etc. across multiple devices; estimate and projections, which allows accurate estimates of available impressions and their costs; mobile rich media rich capabilities, which support rich media mobile ads that involve user interaction; in-app ads, which allows for ads to be placed in mobile apps; contextual textual targeting, which is able to match a marketer's ad with specific content on a site or page; geotargeting, which allows a marketer to tailor ads based on consumer general region, state, or designated market area; or frequency capping, which allows a marketer to set a limit on how many times a consumer sees their ad.

Tracking pixel data may be used by a data augmentation system in connection with a plurality of bidding platforms to optimize bid placements across more than one bidding platform in an RTB ad exchange system. It is an object to provide a system for tracking ad placements for an ad campaign or related campaigns.

Tracking pixels that cause ad placements/consumption to be reported may be embedded in ads. Tracking pixels across bidding platforms may be addressed to a common tracking pixel server to create a consolidated report of placements. A tracking pixel server may be connected to one or more bidding platforms.

Tracking pixel data may be used to assist in actions that optimize ad placement. A tracking pixel server may aggregate data across all connected bidding platforms. A tracking pixel server may also generate reports. Tracking pixel data may measure ad impressions, but does not measure the activity the advertiser is attempting to promote.

A tracking pixel may refer to an object that is designed to be embedded in a digital ad for tracking ad impressions. The tracking pixel may include code that automatically reports back to a remote server various tracking pixel data (see below) related to the ad impression, such as an IP address (IP) of a device that the digital ad was delivered to and the time of delivery. A tracking tag implemented through an embedded image, referred to as "a lightweight 1×1 pixel," may be used. As described herein, the time of delivery is presumed to be the same, or nearly the same, as the time that the ad impression is made (e.g., displayed) on the device.

"Tracking pixel data" may include identifiers and other optional additional data that are returned to the remote server from a device that receives the digital ad with the tracking pixel. The identifiers may include one or more of IP addresses and device ID's. Optional additional information may include the device ID, placement details of the digital ad on a display screen of the device, type of website or email used, time the email was read, or website was visited, activities on the website during a session, operating system used (which may be indicative of the use of mobile devices), type of client used (for example a browser or mail program), and client's screen resolution.

A bid request may include an indication of the activity which spawned the bid opportunity. For example, certain apps may create records or metadata when in use. The system may capture and store an identification of the app issuing the advertising opportunity, particularly in the event of a successful bid.

A closed loop attribution system may be utilized in connection with data sets identifying advertising modalities such as described above, but does not require such augmented data sets. An attribution system may benefit by identification of additional conversions. For example, the physical location of a user may be important to an advertiser as both a conversion metric and a modality factor. A data augmentation system may collect ad data, airing data, and viewing data in connection with a user for use in making bidding decisions. The viewer data may include an identification of programs, an identification of advertisements viewed on various media, or exposure information. In addition, an identification of the advertisement placements a user is exposed to may be detected by a probe in connection with a user device. The detection may rely on automated content recognition and may be based on audio and/or video content. The location of a personal communication device which may be associated with a user may be tracked over time. The location data may be accumulated independently of any viewership/exposure information. The device location may be obtained through location services or through device interaction with monitoring systems such as Bluetooth beacons located at points of interest for determining exposure and/or conversion.

The system may be utilized to measure the impact of viewership or exposure and other modalities. For example, historic location information may be utilized to determine the incidence or rate of visits to a location of interest before a user is exposed to an advertisement against incidence of visits to such location after being exposed to an advertising modality. An attribution system may also rely on a comparison between visits by users who have been exposed to an advertisement against visits by users who have not been exposed to an advertisement. A combination of measures may be utilized to compensate for bias to independent tendencies for visiting a location of interest. An additional metric for conversions may rely on user dwell times in a location. Dwell times may be derived by monitoring geo-location of a user device over time. Dwell times may be utilized as a conversion measure where pre-exposure dwell time of user is compared to post-exposure dwell time in such location. In addition, dwell times may be utilized in connection with comparisons of exposed users to unexposed users. Furthermore, dwell times may be utilized for comparisons between users prior to execution of advertising modalities and/or campaigns as compared to dwell times after execution of modalities or campaigns, even without user exposure data.

Various objects, features, aspects, and advantages of the present invention will become more apparent from the following detailed description of preferred embodiments of the invention, along with the accompanying drawings in which like numerals represent like components.

Moreover, the above objects and advantages of the invention are illustrative, and not exhaustive, of those that can be achieved by the invention. Thus, these and other objects and advantages of the invention will be apparent from the description herein, both as embodied herein and as modified in view of any variations which will be apparent to those skilled in the art.

BRIEF DESCRIPTION OF THE DRAWINGS

FIG. 5 shows an example of content in a tracking pixel database.

DETAILED DESCRIPTION OF THE PREFERRED EMBODIMENT

Figure 1:
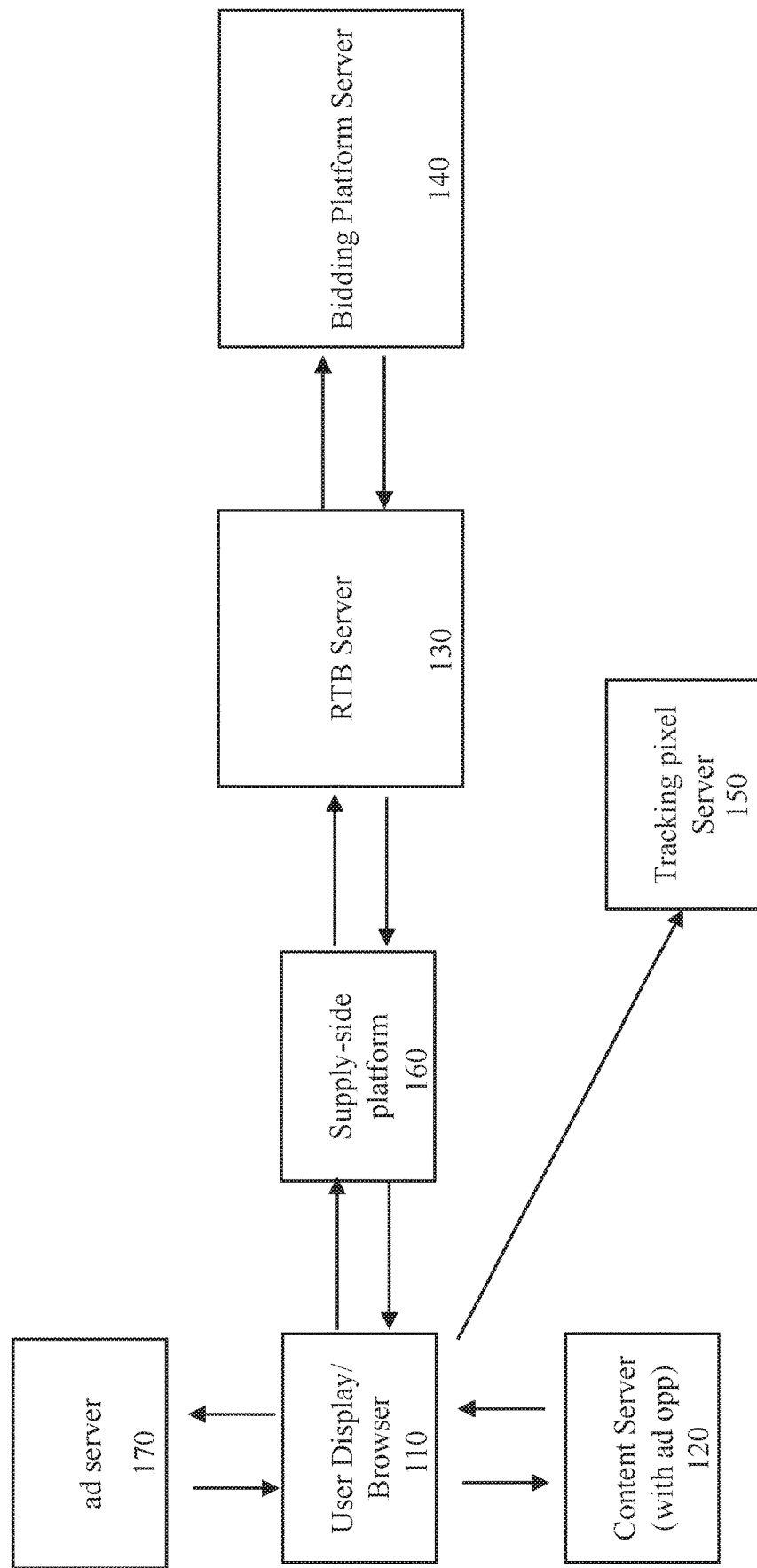
FIG. 1 schematically shows a system for a real-time bidding ad exchange.

Before the present invention is described in further detail, it is to be understood that the invention is not limited to the embodiments described, as such may, of course, vary. It is also to be understood that the terminology used herein is for describing embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by prior invention. Further, the dates of publication provided may be different from the actual publication dates, which may need to be independently confirmed.

The invention is described in detail with respect to preferred embodiments, and it will now be apparent from the foregoing to those skilled in the art that changes, and modifications may be made without departing from the invention in its broader aspects, and the invention, therefore, as defined in the claims, is intended to cover all such changes and modifications that fall within the true spirit of the invention.

The system may relate to assessment of the effectiveness of a real-time bidding campaign. Real-time bidding may be used to place bids for electronic media impression auctions and, if the bid is won, the buyer's ad is instantly displayed on the publisher's site.

A key advantage of real-time bidding is the value of ads are optimized per impression, which allows advertisers to maximize ad effectiveness and publishers to realize maximum value from presentation of ads. Real-time bidding lets advertisers manage and optimize ads from multiple ad-networks by granting the advertiser access to a multitude of different networks, allowing them to create and launch advertising campaigns, prioritize networks and allocate percentages of unsold inventory.

Real-time bidding systems may utilize tracking pixels for confirmation of ad placement. A tracking pixel may be a small (usually transparent) GIF or PNG image that is embedded in an HTML page, usually a webpage or the content of an email. Tracking pixels may also use HTML IFRAME, style, script, input link, embed, object, and other tags. When a user opens a webpage or email, such image and other information is downloaded. This download requires the browser to send a request to the server storing that image or information, allowing the party running that server to keep track of the HTML page.

Tracking pixels may be fetched from a third-party ad server, not from the server the main webpage was fetched from. Because of this, advertisers may gather information about visitors when visitors request HTML content from the main webpage server and can thus track certain properties of the browsing habits of web users.

FIG. 1 schematically shows a system for a real-time bidding ad exchange. FIG. 1 shows a user display or browser 110 that displays content potentially including ads to a user. The user display or browser 110 may be attached to a stationary device or mobile device such as a smart phone or tablet. The user display or browser 110 may be configured to access web sites using HTTP protocol or another protocol. The webpage accessed by the user display or browser 110 may contain Internet HTML reference to a content server 120. Upon the user accessing the content of the publisher, the content server 120 returns the requested content to the user display or browser 110, which may be in the form of HTML. The returned HTML may contain an "ad opportunity" to display an ad. The HTML may direct the user display or browser 110 to an ad network or ad exchange to retrieve ad content.

In the embodiment shown in FIG. 1, HTML directs the user display or browser 110 to retrieve an ad from a supply-side platform 160. The supply-side platform 160 may optionally perform operations on the ad request, such as acquiring information about the user from a data provider or the display or browser 110. The supply-side platform 160 then sends the ad request to an RTB server 130. The RTB server 130 may be connected to bidding platform servers 140 (only one shown for clarity). After receiving the ad opportunity, the RTB server 130 may be configured to "auction" the ad opportunity to the bidding platform servers 140.

Each bidding platform server 140 may be bidding on behalf of one or more advertisers or campaigns. The bidding platform servers 140 may use internal logic to determine how to value a bid for an ad, based on several criteria regarding the ad or campaign. In addition, the bidding platform servers 140 may use the information about the ad opportunity and the user requesting the ad, as provided by the RTB server 130, to assess the value of the ad opportunity to the advertiser. The bidding platform servers 140 then send their bids for the ad opportunity to the RTB server 130, which determines which bid will fulfill the ad opportunity.

A content publisher may have the capacity to preempt an auction by maintaining a publisher ad server. The publisher ad server may have pre-cached criteria for which, when satisfied, prompts delivery of the ad opportunity to the RTB server. In this case, the criteria are satisfied, and the HTML code directs the user display or browser 110 to the publisher ad server rather than the RTB server 130. The functions of the publisher ad server could also advantageously be performed by the supply-side platform 160.

When an ad opportunity if fulfilled by the RTB server 130, the bidding platform server 140 (or equivalent) of the winning bid passes instructions to the RTB server 130 for retrieving the ad. In the embodiment shown in FIG. 1, these instructions are passed to the supply-side platform 160, and then to an open HTTP connection of the user display/browser 110. In another embodiment, the instructions may be passed through additional locations such as a publisher ad server, or the RTB server 130 may pass the instructions directly to the user display/browser 110.

The user display/browser 110 then follows the instructions to retrieve the ad from an ad server 170. In one embodiment, the ad server 170 may be advantageously contained within the bidding platform server 140. Upon receiving the request for the placement of an ad, the ad server 170 may deliver the ad to the user display/browser 110 or may deliver the address of the ad to the browser 110, which in turn may retrieve the ad from the address indicated.

The ad delivered to the user display/browser 110 may be embedded with a tracking pixel or web beacon to track the ad impression. A tracking pixel may be a small GIF or PNG image that is embedded in an HTML page. The image may be transparent or may be the same color as the background. Tracking pixels may also use HTML IFRAME, style, script, input link, embed, object, and other tags to track the ad impression. The tracking pixel may include an external link to a tracking pixel server 150. When the HTML code is processed by the user display/browser 110, the user display/browser 110 executes the code of or associated with the tracking pixel. This may be a report to a tracking pixel server 150 or a request for content from the tracking pixel server 150. The content from the tracking pixel server 150 or the code associated with the tracking pixel may cause tracking pixel data to be transmitted. Tracking pixel data may include one or more identifiers and/or other optional additional data. The identifier may include one or more of IP addresses and/or device ID's. Optional additional information may include the device ID, placement details of the digital ad on a display screen of the device, type of website or email used, time the email was read, or website was visited, activities on the website during a session, operating system used (which may be indicative of the use of mobile devices), type of client used (for example a browser or mail program), and client screen resolution. Tracking pixels may facilitate tracking ads delivered as web content or content delivered by email.

Once the tracking pixel server 150 receives the tracking pixel and tracking pixel data, the tracking pixel server 150 may record the tracking pixel data in the tracking pixel server logs.

Figure 2:
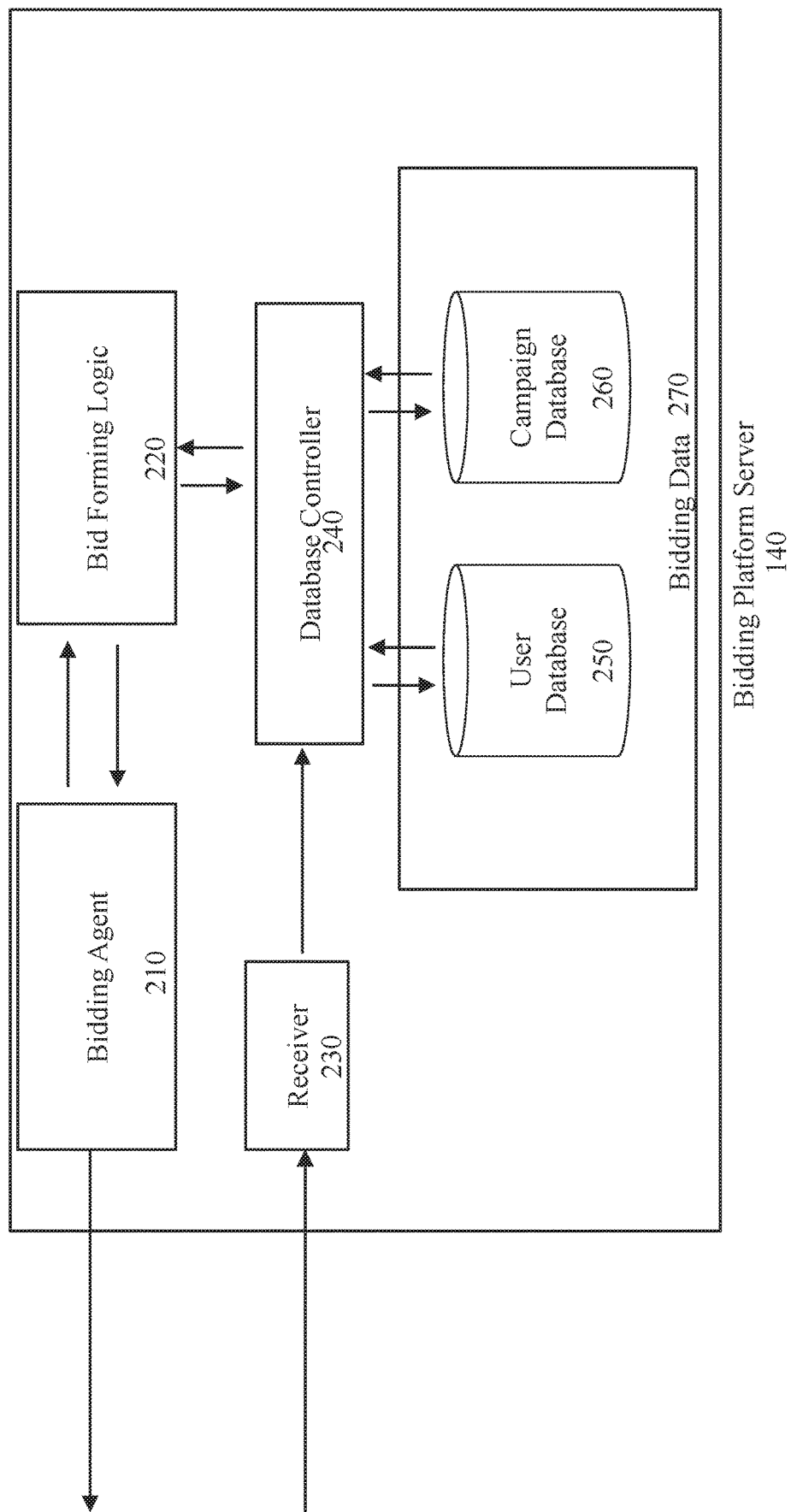
FIG. 2 shows a schematic of a bidding platform server.

FIG. 2 shows a schematic of a bidding platform server. FIG. 2 shows a receiver 230 that is configured to receive an ad opportunity. The bid may include information such as the user's IP address, device ID, and user data such as demographic information. The receiver 230 may be configured to send the ad opportunity to a database controller 240. The database controller 240 may have access to several types of data that may be used to inform bids. A user database 250 may contain data indexed by users' IP address or device ID and may also contain information such as personal or demographic information, user preferences, and prior advertising exposure of the user.

A campaign database 260 may include information regarding the desired criteria for ad opportunities. For example, an ad campaign may be set up to target a certain geographic region or certain demographic of people. The campaign database 260 may also include information such as the budgetary constraints of the campaign or specification of content for ad placement. For example, an ad campaign may limit the total spend amount, spend per ad, and specify websites for ad placements.

The collection of data that informs the bid may be referred to as the bidding data 270. While the embodiment in FIG. 2 shows a user database 250 and campaign database 260, any number of databases may be maintained to inform bidding. For example, an ad for sunscreen may find greater value in fulfilling ad opportunities based on weather. In this case, the bidding data 270 may include an additional database that contains information regarding the current weather by geographic location.

The database controller 240 may inform the bid forming logic 220 of the bid opportunity. The bid forming logic 220 may be configured to assess the bid opportunity based on the information regarding the bid opportunity and the bidding data 270. The bid forming logic 220 may use any number of methods for valuing bids based on datasets, as is known in the art. For example, some approaches may simply use a weighed sum of criteria vectors for resource constrained applications, while other sophisticated methods may use machine learning techniques such as Bayesian Classifiers, cluster analysis, decision trees, and artificial neural networks.

U.S. Pat. No. 9,129,313 B1 entitled, "System and method for optimizing real-time bidding on online advertisement placements utilizing mixed probability methods" is expressly incorporated herein by reference, discloses a system and method for optimizing real-time bidding on advertisements by utilizing mixed probability methods. The system assigns several probability scores based on various criterion, and then calculates a combined probability score and threshold based on these scores when a real-time bid request is received.

The bid forming logic 220 may establish and transmit bidding parameters to the bidding agent 210. The format of this communication may depend on the embodiment. In a real-time bidding environment in which the RTB server auctions the ad opportunity to the highest bidder, the communication from the bid forming logic 220 to the bidding agent 210 may be in the form of the bid amount. The bidding agent 210 may be configured to interact with an RTB server.

Figure 3:
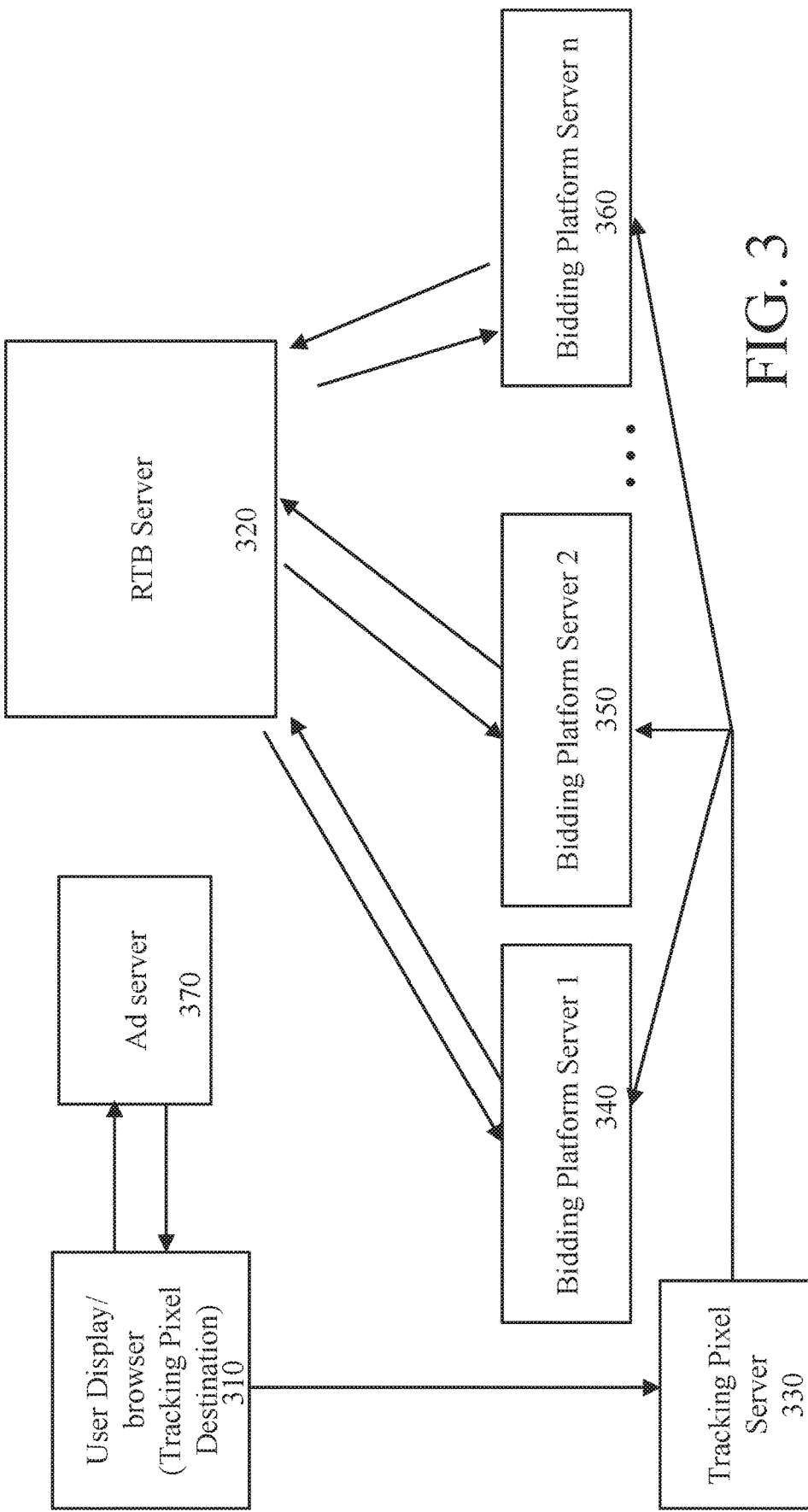
FIG. 3 shows an embodiment of a system for cross platform real-time bidding data augmentation.

FIG. 3 shows a system for cross platform real-time bidding data augmentation for use with an RTB server 320. As shown previously in FIG. 1, the user display/browser 310 follows the instructions to retrieve the ad from the ad server 370. Upon receiving the request for the placement of an ad, the ad server 370 delivers the ad to the user display/browser 310. The ad delivered to the user display/browser 310 may have an embedded tracking pixel to track the ad impression.

The tracking pixel includes an external link to a tracking pixel server 330. When the HTML code is processed by the user display/browser 310, the user display/browser 310 sends the tracking pixel data to the tracking pixel server 330. Tracking pixel data may include identifiers and may include other optional additional data.

The tracking pixel server 330 may be in communication with a plurality of bidding platform servers 340, 350, 360. FIG. 3 shows three bidding platform servers, but it will be appreciated by those skilled in the art that any number may be used depending on the embodiment. The tracking pixel server 330 may facilitate coordination between bidding platforms severs 340, 350, 360.

Figure 4:
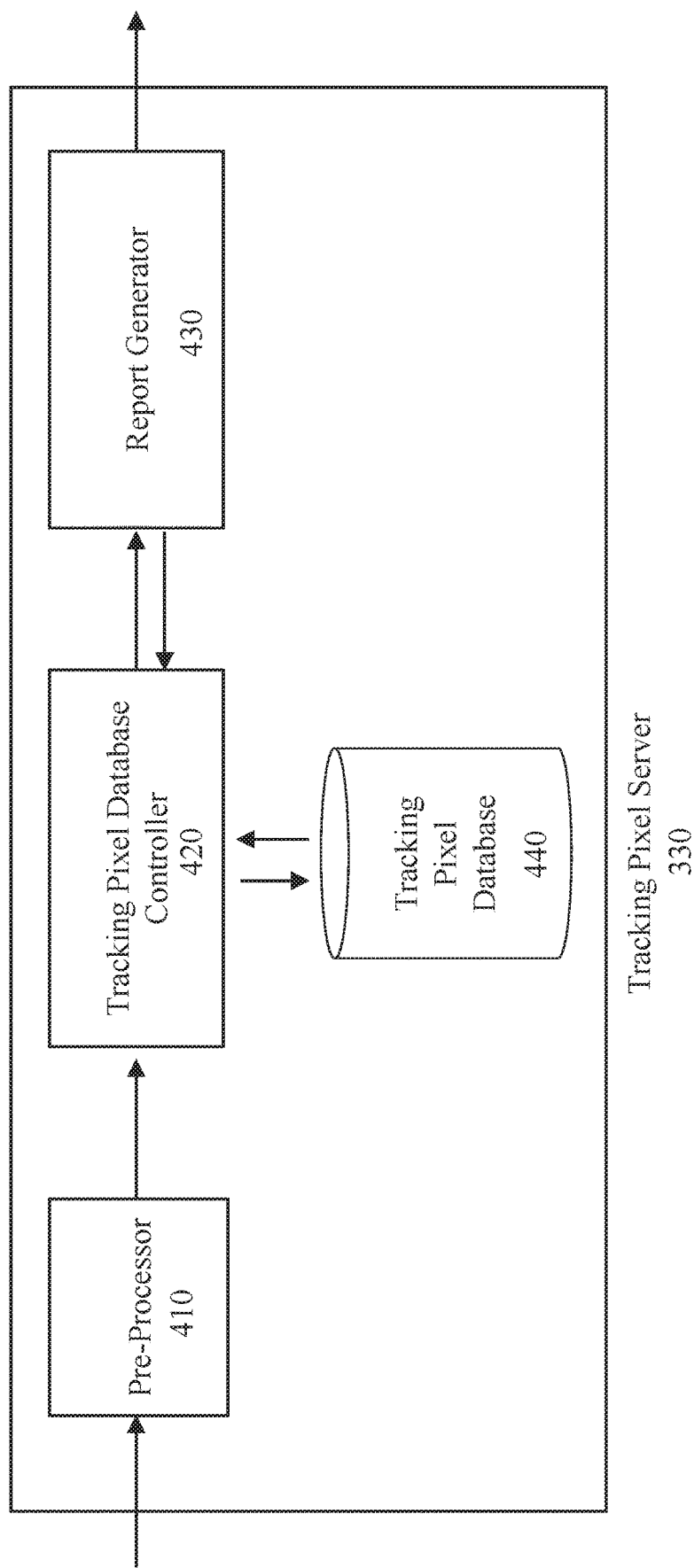
FIG. 4 shows a schematic of a tracking pixel server.

FIG. 4 shows a schematic of a tracking pixel server. The tracking pixel server may be placed on a standalone server or integrated with another component of the system, such as a bidding platform server. A pre-processor 410 may receive the tracking pixel data, and optionally, additional data. The pre-processor 410 may format and segregate the incoming information according to the requirements of the embodiment. After converting the information into an acceptable format, the pre-processor 410 may deliver some or all the information to a tracking pixel database controller 420. The tracking pixel database controller 420 may be connected to a tracking pixel database 440 that maintains tracking pixel data of a plurality of bidding platforms. The tracking pixel database controller 420 may log the receipt of the tracking pixel data, as well as any other metadata such as a timestamp of the receipt, in the tracking pixel database 440.

The tracking pixel database controller 420 may also update a tracking pixel database 440 with the received tracking pixel data according to the embodiment. The tracking pixel database controller 420 may query the tracking pixel database 440 to determine if the identifier of the tracking pixel is already found in the tracking pixel database 440. If the identifier is not found in the tracking pixel database 440, the tracking pixel database controller 420 may direct the tracking pixel database 440 to create a new user entry. User entries may be indexed by one or more identifiers, such as the IP address or device ID. If the identifier of the tracking pixel is already found in the tracking pixel database 440, the tracking pixel database controller 420 may update the existing user entry.

In addition, or alternatively, a report generator 430 may be maintained to periodically inform the plurality of bidding platform servers of received tracking pixels and tracking pixel data. The format and frequency of this informing depends on the embodiment. In one embodiment, the report generator 430 may inform the plurality of bidding platform servers of a received tracking pixel (and tracking pixel data) every time the tracking pixel server receives a tracking pixel. In another embodiment, the report generator 430 may maintain a cache of received tracking pixels and tracking pixel data and send aggregated tracking pixel data at specified intervals. The tracking pixel database 440 may also be formatted to maintain a cache of tracking pixel data that has been received since the last time the report generator 430 provided the plurality of bidding platform servers with a report of tracking pixel data.

The report generator 430 may also be configured to track campaigns or related campaigns. Campaign information, as well as other information (such as information from external sources including third-party information or user information) that may assist in optimizing bids such as current event data, may be stored in the report generator 430 or another location, depending on the implementation.

A tracking pixel process, whether dedicated or centralized to disparate bidding platforms may be helpful in bid management. A report generator 430 may use aggregated tracking pixel data in the tracking pixel database 440 to assist in other actions that facilitate satisfaction of ad placement criteria. In one embodiment, the report generator 430 may be configured to periodically assess certain metrics, such as the reach of an advertisement. For example, the report generator 430 may request from the tracking pixel database controller 420 the geographic location of ad placements over a certain time period. The report generator 430 may then generate aggregate statistics and assess the reach of the campaign in a geographic location. Such aggregate statistics may be compiled into reports and sent to bidding platform servers to further inform bidding. Such reports may also be sent to advertisers to allow advertisers the opportunity to assess the status of the campaign. Report generator 430 may use such campaign information in conjunction with the aggregated tracking pixel data in the tracking pixel database 440 to compare against campaign benchmarks, as discussed above.

The report generator 430 may make determinations that result in commands or requests that bidding platform servers change their bidding behavior. Report generator 430 may be configured to periodically assess certain metrics, such as the reach of the advertisement.

FIG. 5 shows an example of content in a tracking pixel database 440. Tracking pixel data may be indexed by a unique identifier such as a Bid ID 502 (as shown), and/or another identifier such as the IP address 503 and/or device ID 504. The set of optional tracking pixel data is meant to be illustrative, not exhaustive and may include such information as operating system 505, browser 506, domain 507, URL 508, time stamp 509, country 510, region 511, city 512, ad slot size 513, ad exchange 514, content category 515, campaign ID 516, and creative ID 517.

Figure 6:
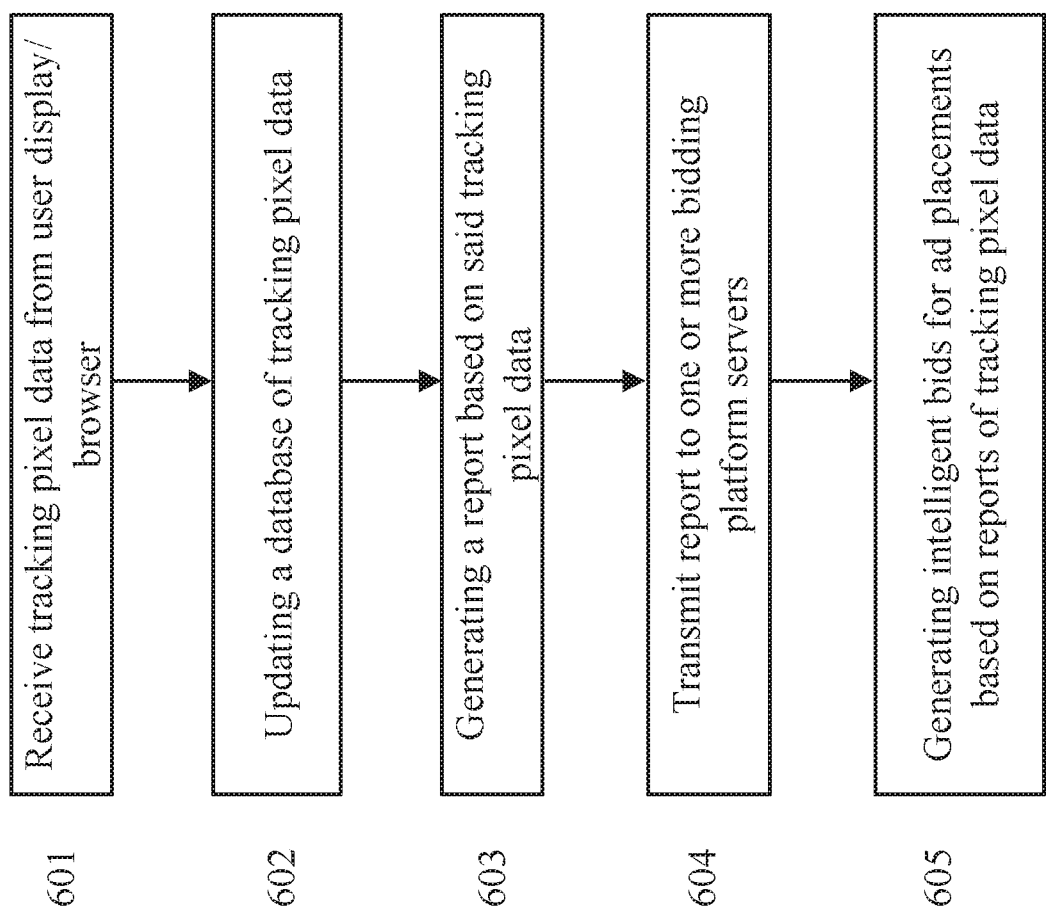
FIG. 6 schematically shows a flow diagram of an embodiment for cross platform real-time bidding data augmentation.

FIG. 6 schematically shows a flow diagram for cross platform real-time bidding data augmentation. The tracking pixel server 330 may receive tracking pixel data from the user display/browser 310 in step 601. The receiving step 601 may involve pre-processing to format and segregate incoming information according to the requirements of the embodiment. A database of tracking pixel data may be updated with the received tracking pixel data in step 602. The updating operations 602 may depend on the tracking pixel data and implementation. For example, tracking pixel data with an identifier that is unknown to the tracking pixel database 440 may require the tracking pixel database controller 420 direct the tracking pixel database 440 to create a new entity entry, while a known identifier may result in the tracking pixel database controller 420 updating the existing entity entry.

A report of the tracking pixel data may be generated by the report generator 430 in step 603. The report may represent tracking pixel data from more than one bidding platform server, and thus the resulting report may provide augmented data to a bidding platform server that was previously unavailable to the individual bidding platform servers. The reports may take a variety of different forms, depending on the embodiment.

The result of step 603 is that the report is delivered to bidding platform servers in step 604.

An RTB server may be configured to provide various data fields to a receiver 230 of a bidding platform server. This may be accomplished by program instructions retrieved when a reference to an ad opportunity is encountered by a user browser or other display program. The HTML instruction acquire and transmit user identification data and current data about the user activity and platform. This may be combined with historical information regarding the user. The user may be identified by some user ID, cookie data, IP address, or MAC address. The historical data may be updated with relevant current information. Some or all the data may be provided to a bidding platform server 140. The bidding platform server 140 may combine the data with other data it may have concerning the user, for example, television viewership, current and/or historical and campaign data for formulating a bid in the bid forming logic 220. In some platforms, the ad opportunity may be generated in an app, such as a mobile game app. An identification of the app that generated the ad opportunity may be delivered to the bidding platform server 140.

The database controller 240 may receive tracking information triggered by processing a tracking pixel. The tracking information is indicative of a successful placement. The successful placement triggers the database controller 240 to record the placement in the campaign database 260.

Figure 7:
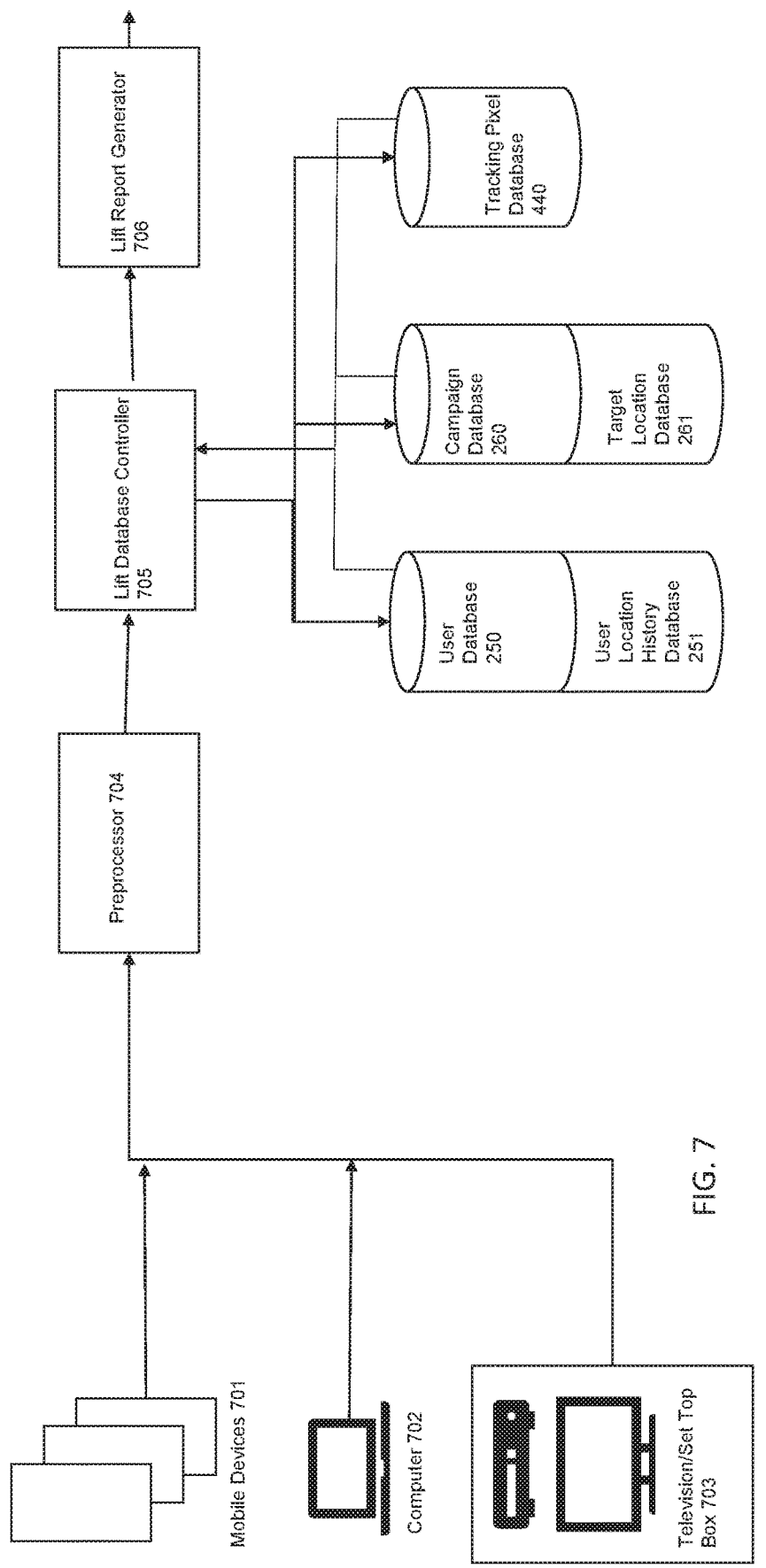
FIG. 7 schematically shows a closed loop attribution system.

A closed loop attribution system schematically illustrated in FIG. 7 may be utilized to assess effectiveness of an advertising campaign by determining campaign lift. The campaign lift measurement may be provided to advertisers, agencies, and other entities involved in marketing to assess effectiveness of advertising modalities. The system relies on available data from mobile devices 701, stationary computing devices 702, and television/set-top boxes 703.

The mobile devices 701 may provide information as described herein above including media and advertising exposure information through automatic content recognition (audio and/or video content recognition) or direct reporting. Mobile devices 701 may also provide location information. The location information may be stored in the user location database 251 in order to establish data showing user location history. The location information may be derived based on reports issued by the mobile device 701 utilizing location services which may be derived from Wi-Fi or Bluetooth low energy triangulation, including by beacons and/or i-Beacons. Mobile devices 701 may also be targeted with advertising which may include tracking pixels which may generate a report to pre-processor 704 either directly or through a tracking pixel server (not shown) in conjunction with tracking pixel database 440. Mobile device 701 may also provide other user activity information, user and device identification, and status.

User computers 702 hosting a display/browser may also be targeted by advertisers using real-time bidding systems. The user computers 702 may generate information similar to the mobile devices 701. Televisions/set-top boxes 703 may also generate exposure data reflecting user activities such as viewing and advertising exposure. While FIG. 7 illustrates only a few mobile devices 701, and a single user computer 702, and television/set-top box 703, it is to be understood that software on many such devices will be provided in order to carry out the communications and reporting described herein.

The information generated by mobile devices 701, user computers 702, and televisions/set-top boxes 703 may be provided to pre-processor 704 for selection and formatting. The pre-processor 704 is connected to the lift database controller 705. The lift database controller 705 is connected to the user database 250 and user location history database 251. The lift database controller 705 is also connected to the campaign database 260 and the tracking pixel database 440. The lift database controller 705 may process the information through to a report generator 706. The report generator 706 may provide report of the lift attribution for each advertising modality subject to analysis. The reports may be generated during a campaign and/or after a campaign for use in assessing effectiveness. In addition, lift information may be provided to the campaign database which can operate to modify the bidding logic during a campaign in order to take advantage of preliminary assessment of lift attribution for advertising modalities. In this manner, it is possible to utilize preliminary lift attribution in order to enhance the bidding logic and to automate the process of modifying a campaign to make more placements of the type that appear to be providing lift and decrease the placements of the type that do not appear to be affecting lift.

The invention is described in detail with respect to preferred embodiments. It will be apparent to those skilled in the art that certain changes and modifications may be made without departing from the invention in its broader aspects, and the invention, therefore, as defined in the claims, is intended to cover all such changes and modifications that fall within the true spirit of the invention.

The terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A closed loop attribution system comprising:
   a user location history storage system containing information indicative of user location history for a plurality of users based on location of a mobile device associated with a user wherein said information indicative of user location history includes identification of a user and identification of time and user location at such time;
   a user database storage system containing placement tracking information indicative of advertising content presented to said user and time of presenting of advertising content presented to said user;
   a tracking pixel server configured to receive tracking pixel information identifying a user, identifying content said user is exposed to and identifying time of user exposure;
   a closed loop attribution processor to assess effectiveness of an advertising campaign responsive to said user location history storage system and said user database storage assessing correlations between a user's exposure and a user's location by comparing a first metric derived from user location of user exposure to identified content to a second metric derived from user location history after a time of user exposure to such identified content.

2. The closed loop attribution system according to claim 1 wherein said user database further comprises user records indicative of user behavior and characteristics.

3. The closed loop attribution system according to claim 2 wherein said closed loop attribution processor is connected to said campaign database and wherein said campaign database contains an indication of one or more locations of interest to an advertiser.

4. The closed loop attribution system according to claim 3 wherein said correlation between user exposure and a user's location is a correlation between user exposure and said one or more locations of interest.

5. The closed loop attribution system according to claim 1 wherein said first metric and said second metric are user dwell time at a location of interest.

6. The closed loop attribution system according to claim 1 wherein said first metric and said second metric are visit counts.

* * * * *